United States Patent
Pomposini et al.

(10) Patent No.: US 12,337,628 B2
(45) Date of Patent: Jun. 24, 2025

(54) METHOD FOR THE TREATMENT OF CORDS FOR THE REINFORCING LAYERS OF PNEUMATIC TIRES

(71) Applicant: Bridgestone Europe NV/SA [BE/BE], Zaventem (BE)

(72) Inventors: Cristiano Pomposini, Rome (IT); Giacomo Andreini, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 395 days.

(21) Appl. No.: 17/780,661

(22) PCT Filed: Nov. 27, 2020

(86) PCT No.: PCT/IB2020/061235
§ 371 (c)(1),
(2) Date: May 27, 2022

(87) PCT Pub. No.: WO2021/105952
PCT Pub. Date: Jun. 3, 2021

(65) Prior Publication Data
US 2023/0009169 A1    Jan. 12, 2023

(30) Foreign Application Priority Data

Nov. 29, 2019 (IT) .................. 102019000022524

(51) Int. Cl.
| | | |
|---|---|---|
| *B60C 9/00* | (2006.01) | |
| *B29B 15/12* | (2006.01) | |
| *B29D 30/38* | (2006.01) | |
| *B60C 9/20* | (2006.01) | |
| *D06M 15/693* | (2006.01) | |
| *D06M 15/70* | (2006.01) | |
| *D06M 101/32* | (2006.01) | |

(52) U.S. Cl.
CPC .......... *B60C 9/0042* (2013.01); *B29B 15/125* (2013.01); *B29D 30/38* (2013.01); *B60C 9/0064* (2013.01); *B60C 9/2009* (2013.01); *D06M 15/693* (2013.01); *D06M 15/70* (2013.01); *B29D 2030/383* (2013.01); *B60C 2009/0092* (2013.01); *B60C 2009/2077* (2013.01); *B60C 2009/2096* (2013.01); *D06M 2101/32* (2013.01)

(58) Field of Classification Search
CPC ... B60C 9/0042; B60C 9/0064; B60C 9/2009; B60C 2009/0092; B60C 2009/2077; B60C 2009/2096; B29B 15/125; B29D 2030/383; D06M 15/693; D06M 15/70; D06M 2101/32
See application file for complete search history.

(56) References Cited

U.S. PATENT DOCUMENTS

| | | | |
|---|---|---|---|
| 5,240,772 A | * 8/1993 | Henning | B60C 9/0042 428/397 |
| 2007/0243375 A1 | * 10/2007 | Kohashi | B60C 9/0042 428/364 |

FOREIGN PATENT DOCUMENTS

| | | | |
|---|---|---|---|
| EP | 0350944 A2 | 1/1990 | |
| EP | 1111103 A1 * | 6/2001 | ............. D01F 6/30 |
| EP | 2799599 A1 | 11/2014 | |
| JP | 2011202342 A | 10/2011 | |
| WO | WO-2010143017 A1 * | 12/2010 | ......... B60C 9/0042 |

OTHER PUBLICATIONS

International Search Authority: European Patent Office Search Report for corresponding International Patent Application No. PCT/IB2020/061235 dated Jan. 22, 2021, 4 pages.

* cited by examiner

*Primary Examiner* — Jeremy R Pierce
(74) *Attorney, Agent, or Firm* — Patterson Intellectual Property Law, PC

(57) ABSTRACT

Method for the treatment of single-filament polyethylene terephthalate cords for the reinforcing layers of a pneumatic tyre comprising (a) an adhesive solution coating step, wherein the single filament cord is immersed in an adhesive solution; (b) a drying step, wherein the cord covered in adhesive resin is held within a drying oven at a temperature of between 12° and 180° C.; and (c) a thermobonding step wherein the cord, proceeding from the drying step, is arranged within an oven at a temperature of between 23° and 260° C. for a period of between 30 and 90 seconds. During the thermobonding step, the single filament cord is subjected to a tension of between 8 and 12 mN/dtex.

7 Claims, No Drawings

METHOD FOR THE TREATMENT OF CORDS FOR THE REINFORCING LAYERS OF PNEUMATIC TIRES

The present invention relates to a method for the treatment of cords for the reinforcing layers of a pneumatic tire.

In recent years, one of the priorities in the field of pneumatic tire research has been that of reducing the noise that pneumatic tires produce both inside and outside the passenger cabin.

This necessity clashes with the trend to reduce the weight of pneumatic tire with the aim of lowering the rolling resistance. In fact, as is known to a person skilled in the art, reducing the weight of a pneumatic tire, notwithstanding the improvement in terms of rolling resistance that this entails, leads, however, to an increase in the level of noise produced during operation.

As is known to a person skilled in the art, reinforcing plies are commonly used as a reinforcing material within the carcass, in the belts and in the cap-ply. In particular, said cap-ply is arranged between the belts and the tread belt.

For some time, part of the research within the sector of pneumatics tires has been concentrated upon studying new reinforcing plies for the cap-plies of pneumatic tire, with the aim of obtaining an improvement both in terms of rolling resistance and in terms of the noise produced.

In particular, a cap-ply has been made comprising a reinforcing ply composed of polyethylene terephthalate (PET) cords, wherein each thereof comprises a single filament having a linear density of between 500 and 3000 dtex.

Cap-plies made using the above plies, even though they satisfy the requirements in relation to lower weight and less noise, have however some critical issues of a mechanical nature, in particular in relation to high speed durability.

The inventors of the present invention have produced a treatment for the single filament cords of the plies for cap-plies that, in addition to having advantages in relation to lower weight and a lower level of noise, also ensure the required levels of high speed durability.

The object of the present invention is a method for the treatment of polyethylene terephthalate cords for the reinforcing layers of a pneumatic tire; said method comprising (a) an adhesive solution coating step, wherein the single filament cord is immersed in an adhesive solution; (b) a drying step, wherein the cord covered in adhesive resin is held within a drying oven at a temperature of between 12° and 180° C.; and (c) a thermobonding step wherein the cord, proceeding from the drying step, is arranged within an oven at a temperature of between 23° and 260° C. for a period of between 30 and 90 seconds; said method being characterized in that during said thermobonding step the single-filament cord is subjected to a twisting tension of between 8 and 12 mN/dtex.

Preferably, said thermobonding step is performed at a temperature of between 235 and 250° C.

Preferably, said thermobonding step endures for a period of between 40 and 80 seconds.

Preferably, each of said cords has a linear density of between 1000 and 2000 dtex.

Preferably, each of said cords has a twist factor of between 70 and 180; more preferably between 120 and 160.

The twist factor is represented by the following formula $Tf = a \cdot Nt \cdot T^{0.5}$, wherein $a = 8.513 \cdot 10^{-3}$, Nt is the twist level (twists per meter) and T is the linear density (dtex) of the cord.

A further object of the present invention is a cap-ply made using plies comprising single-filament cords treated according to the method of the present invention.

A further object of the present invention is a pneumatic tire comprising a cap-ply wherein the ply thereof comprises single-filament cords treated according to the method of the present invention.

The following are exemplary non-limiting embodiments given purely by way of illustration.

Four cap-plies (A-D) were made. Cap-ply A is a comparative example comprising a reinforcing ply made from multi-filament cords and represents the currently adopted solution. The cap-plies B and C comprise a reinforcing ply according to the present invention, whilst cap-ply D is a comparative example, insofar as the single-filament cords have been subjected to treatment wherein the characteristics thereof deviate from those reported within the attached claims.

In particular, the reinforcing ply of cap-plies B-C was made using single-filament cords of PET, characterized by a linear density within the range of between 1000 and 2000 dtex and a twist factor within the range of between 70 and 140.

In comparison, the reinforcing ply of cap-ply A was made, in accordance with the practice commonly adopted, using dual-filament PET cords. Each of the PET filaments has a linear density of 1100 dtex and a twist factor number of 104.

Each of the cap-plies was made embedding the ply between two layers of rubber compound.

In Table I the composition in phr is recorded of the compound used for the manufacture of the cap-ply.

TABLE I

| | |
|---|---|
| Natural rubber | 100 |
| Carbon black | 40 |
| Sulfur | 40 |
| Vulcanization accelerator agent | 1.5 |

The natural rubber is the cis-1,4-polyisoprene rubber of natural origin.

The vulcanization accelerator is TBBS (N-tert-butyl-2-benzothiazyl sulfenamide).

The cap-plies thus made were subjected to elastic modulus and durability measurements.

The elastic modulus of the cords was measured using a dynamic mechanical analyzer (DMA). The value is calculated based upon the storage modulus measured at a temperature range of between 3° and 160° C., under a preload of 10 N and a frequency of 52 Hz. The elastic modulus is calculated as the ratio between the dynamic force (N) and the dynamic twisting tension (%).

The durability assessment was based upon the fatigue method described below.

The organic material cords submerged in a rubber matrix in such a way as to produce parallel layers of cords. In this way a rubber sample for testing was produced. The rubber sample has a width of 50 mm, a length of 500 mm and a height of 5.5 mm.

The number of cords is 50/50 mm; the distance between the cords is 2.5 mm; the distance between the center of the cords and the surface is 1.5 mm. Subsequently, the rubber sample is suspended from a pulley and a load of 50 Kg/inch (19.7 Kg/cm) is applied in the direction of the axis of the cords, and the twisting tension and compression force are applied cyclically with a frequency of 100 rpm, increasing the number of cycles until a tensile strength degradation of 80% is reached. The durability is then calculated based upon the number of cycles required in order to reach the above condition.

The cap-plies (A-D) above were used to make four tires (Pa-Pd) which differ from one another only insofar as the different cap-ply used.

The Pa-Pd pneumatic tire were subjected to rolling resistance, noise and weight measurements.

The rolling resistance was measured according to the ASTM D5992 standard.

The noise measurement was performed within a semi-anechoic chamber with the dimensions: 8 m (Length)×6 m (Width)×3.5 m (Height), ISO 3744 certified (Sound Power Test).

The pneumatic tire was loaded by means of a pneumatic tire-carrier on a drum coated with a resin shell that simulates the asphalt used for external BPN (British Pendulum Number) approval tests. The measuring equipment was composed of 11 microphones spaced angularly in the same manner in order to evaluate the noise directivity. An algorithm (developed by the Applicant) makes it possible to calculate the predicted external BPN value ($r^2$=0.9) at 80 Km/h.

Table II reports the technical characteristics of the cords and of the method by which they are made, of the respective cap-plies and of the respective pneumatic tire. In order to more clearly show the advantages of the invention, in Table II a few values are indexed to the relative value of the comparative example (cap-ply A), and some of the pneumatic tire characteristics are indicated as a variation of the respective value of the pneumatic tire Pa taken as a reference (Ref.).

TABLE II

|  | A | B | C | D |
|---|---|---|---|---|
| Linear density of the yarn (dtex) | 1100 | 1670 | 1440 | 1670 |
| Cord twist level (tpm) | 260 | 390 | 410 | 390 |
| Cord twist level (tpm) | 260 | — | — | — |
| Twist factor | 104 | 136 | 132 | 136 |
| Thickness of the rubber coating (indexed) | 100 | 100 | 100 | 100 |
| EPDM (cord/dm) | 100 | 100 | 100 | 100 |
| Twisting tension during the thermobonding step (N) | 19.6 | 15.7 | 14.7 | 10.2 |
| Twisting tension during the thermobonding step (mN/dtex) | 8.92 | 9.40 | 10.22 | 6.11 |
| Thermobonding step temperature (° C.) | 240 | 240 | 240 | 240 |
| Thermobonding step duration (seconds) | 60 | 60 | 60 | 60 |
| Modulus at 60° C. (N/%) | 26.7 | 17.3 | 17 | 11.1 |
| Modulus at 160° C. (N/%) | 16.4 | 11.9 | 10.7 | 7.1 |
| Durability (indexed)** | 100 | 110 | 105 | 110 |
| High-speed durability (indexed) | 100 | 99 | 98 | 80 |
| Rolling resistance of the pneumatic tire | Ref. | −2% | −2% | −2% |
| Pneumatic tire noise (dB) | Ref. | −0.7 | −0.6 | −0.7 |
| Pneumatic tire weight (g/pneumatic tire) | Ref. | −62 | −76 | −62 |

These measurements confirmed that the pneumatic tire Pb-Pd: (i) have 2% lower rolling resistance compared to that of the pneumatic tire Pa; (ii) produce 0.4-0.7 dB lower noise than that produced by the pneumatic tire Pa; (iii) have less weight than the pneumatic tire Pa.

Furthermore, the values reported in Table II demonstrate how the method of the present invention, in addition to satisfying the demands in terms of weight and noise, ensure durability values that are comparable with those of the classic plies included in cap-ply A. In fact, the values in relation to cap-plies B and C, wherein the plies thereof were made according to the present invention, have high-speed durability values that are significantly higher than those of cap-ply D, wherein the plies thereof were made using a method that differs from the method according to the present invention. In particular, the cords of the ply in relation to cap-ply D, during the thermobonding step, were subjected to a lower twisting tension than that indicated as an essential feature in claim 1.

To summarize, the method, the object of the present invention, has the great advantage of producing plies that are capable of ensuring a decrease in weight and a decrease in the noise of the related pneumatic tire without, for this reason, compromising the high-speed durability.

Method for the treatment of single-filament cords for the reinforcing layers of a pneumatic tire comprising (a) an adhesive solution coating step, wherein the single filament cord is immersed in an adhesive solution; (b) a drying step, wherein the cord covered in adhesive resin is held within a drying oven at a temperature of between 12° and 180° C.; and (c) a thermobonding step wherein the cord, proceeding from the drying step, is arranged within an oven at a temperature of between 23° and 260° C. for a period of between 30 and 90 seconds. During the thermobonding step, the single filament cord is subjected to a tension of between 8 and 12 mN/dtex.

The invention claimed is:

1. A method for treatment of single filament cords for reinforcing layers of a pneumatic tire, said method comprising:
   an adhesive solution coating step, wherein a single-ply cord comprising a single filament is immersed in an adhesive solution;
   a drying step, wherein the single-ply cord covered in adhesive resin is held in a drying oven at a temperature of between 12° and 180° C.; and
   a thermobonding step wherein the cord, proceeding from the drying step, is arranged within an oven at a temperature of between 23° and 260° C. for a period of between 30 and 90 seconds,
   wherein during said thermobonding step a tensile load of between 8 and 12 mN/dtex is applied to the single filament of the single-ply cord.

2. The method of claim 1, wherein said thermobonding step is performed at a temperature of between 235 and 250° C.

3. The method of claim 1, wherein said thermobonding step endures for a period of between 40 and 80 seconds.

4. The method of claim 1, wherein the single filament cord has a linear density of between 1000 and 2000 dtex.

5. The method of claim 1, wherein the single filament cord has a twist factor of between 70 and 180.

6. The method of claim 1, the single filament cord has a twist factor of between 120 and 160.

7. A method for treatment of single filament cords for reinforcing layers of a pneumatic tire, said method comprising:
   an adhesive solution coating step, wherein a single filament cord is immersed in an adhesive solution;
   a drying step, wherein the cord covered in adhesive resin is held in a drying oven at a temperature of between 12° and 180° C.; and
   a thermobonding step wherein the cord, proceeding from the drying step, is arranged within an oven at a temperature of between 23° and 260° C. for a period of between 30 and 90 seconds, wherein during said thermobonding step the single filament cord is subjected to a tension ranging from about 8.9 mN/dtex to about 10.3 mN/dtex.

\* \* \* \* \*